United States Patent [19]

McGinley et al.

[11] 3,947,604

[45] Mar. 30, 1976

[54] EDIBLE JELLY AND METHOD OF PREPARING SAME

[75] Inventors: Emanual J. McGinley, New Castle, Del.; Francis H. Tolan, Furlong, Pa.

[73] Assignee: FMC Corporation, Philadelphia, Pa.

[22] Filed: Mar. 28, 1975

[21] Appl. No.: 563,242

[52] U.S. Cl. .................. 426/573; 426/577; 426/578
[51] Int. Cl.² ............................................ A23L 1/06
[58] Field of Search ..................... 426/573, 577, 578

[56] References Cited
UNITED STATES PATENTS 3,539,365  11/1970  Durand et al. ....................... 106/197
3,754,925  8/1973  Kimura et al. ....................... 426/573

*Primary Examiner*—Jeanette M. Hunter

[57] ABSTRACT

An edible jelly having improved spreading characteristics and ability for withstanding heat is made by incorporating into the recipe finely-divided, water-insoluble organic particles consisting of 85 to 95% by weight of beta-1, 4 glucan intimately associated with 5 to 15% by weight of sodium carboxymethyl cellulose having a degree of substitution of $0.75 \pm 0.15$.

9 Claims, No Drawings

EDIBLE JELLY AND METHOD OF PREPARING SAME

This invention relates to an edible jelly, particularly a fruit jelly and more especially a pectin or starch jelly having improved spreadability and resistance to heat. While the invention is believed to find its greatest utility in connection with a pectin jelly, it is also useful in connection with a starch jelly. The improved spreadability enables the jelly to be deposited mechanically and pumped under high shear forces in a high speed mechanized operation and the improved heat stability makes it ideally suitable as a topping or filling for bakery goods which are subjected to baking temperatures of 193° to 217°C. for 15 minutes or so.

Conventional bakery jellies are subject to weeping (syneresis) when the structure is fractured mechanically, and they will not withstand the effects of oven heating unless extremely high levels of fruit (30 to 50%) are incorporated, generally a prohibitive practice because of the cost. Although there has been some success with bakery fillings using modified starch formulations, the starch level necessary to maintain structure alters the fine texture typical of the pectin jellies and often contributes to a thick pasty character, gum-like after baking and unacceptable to the baker. Flavor and color also are adversely affected by the high starch content required for the fruit type fillings.

Formulations for typical bakery jellies combine pectin, sugar, acid and water into an interlocking network having a unique fibrous structure similar to a fishnet. Within this structure, thin layers of sugar syrup are free to flow through the various pockets created by the structure. The greater the concentration of pectin present, the firmer and more inelastic the developed structure. Application of a shearing force severs the fibrous network and allows the sugar to flow (weep) from the jelly. The change is irreversible. A similar structural alteration occurs with local heating of the syrup and disruption of the fibrous network, allowing the solution to escape.

It is an object of the present invention to provide an edible jelly having improved spreadability and heat-resistance.

It is a further object of this invention to incorporate in both pectin jellies and starch jellies another gel-forming material which results in a jelly-like product having mechanical stability not subject to syneresis even when fractured mechanically or when subjected to the degree of heat normally encountered in baking.

Yet another object of the invention is to provide a method of preparing an edible jelly having improved spreadability and heat-resistance.

Basically, the above objects are accomplished by incorporating in the jelly recipe a small amount (about 1%) of finely-divided water-insoluble organic particles consisting of 85 to 95% by weight of beta-1, 4 glucan intimately associated with 5 to 15% by weight of sodium carboxymethyl cellulose having a degree of substitution of 0.75 ± 0.15.

This invention constitutes an improvement over that of the U.S. patent to Battista U.S. Pat. No. 3,023,104 which describes the use, in various foods, of cellulose crystallite aggregates having a level-off degree of polymerization.

As described in the United States patent to Durand et al. U.S. Pat. No. 3,539,365, the water-insoluble, water-dispersible beta-1, 4 glucan-containing material is prepared from the source material by a combination of a chemical degradation and mechanical attrition. Chemical degradation may be effected by any of the common well-known methods. A specific method for the commercial production of this type of dispersible material is disclosed in U.S. Pat. No. 2,978,446 to Battista et al. In this method, the source material, that is, native or regenerated forms of cellulose, is subjected to a 2.5N hydrochloric acid solution at its boiling point for 15 minutes. Obviously, more dilute acid may be utilized by raising the temperature of the mass while maintaining an elevated pressure. Other known methods for degrading the cellulose source materials by the use of other acids and by alkalis are also satisfactory. The degraded material is subsequently attrited, preferably in the presence of an aqueous medium, so as to provide the required small particle size.

The amount of energy required for the necessary attrition will be dependent upon the specific raw material. For example, a dilute hydrochloric acid treatment of regenerated forms of cellulose produces a material substantially all of which is attritable to the desired particle size by merely dispersing the same in an aqueous medium with a conventional electrically driven kitchen beater in a matter of a few minutes. Wood pulps and cotton linters, however, after a similar hydrolysis treatment require a substantial amount of energy input and, accordingly, a greater attrition period is used in equipment which is more severe in its attriting action. The relative proportions of larger sized particles in the degraded material also varies inversely with the severity of hydrolysis of the source material. Accordingly, the amount of energy required for the required attrition will also vary inversely with the severity of hydrolysis of the source material.

The mechanical attrition may be effected by the use of various standard equipment such as kitchen mixers, planetary mixers, ball mills, attrition mills, high speed shearing devices and the like. Also, the residue of the hydrolysis treatment preferably in the presence of an aqueous medium may be subjected to a shearing action and to a rubbing action between the particles by forcing the mixture of residue and aqueous medium through passages of limited cross-section such as found in perforated plates. The attrition should be sufficient to produce a mass wherein at least about 1% by weight and preferably at least 30% of the particles have an average length not greater than about 1.0 micron as determined by electron microscopic examination. Some of the particles in such a mass may have a length or maximum dimension as low as a few hundredths of a micron.

The beta-1, 4 glucan may be derived by any desired chemical degradation method applied to a selected cellulose material. Upon completion of the desired degradation, the residue is collected as a filter cake and is thoroughly washed to remove soluble impurities. The washed cake, preferably containing about 40% solids, is then subjected to mechanical disintegration. In the chemical degradation treatment and subsequent washing, microcrystalline cellulose is freed by cleaving the cellulose chains in the amorphous regions but the individual crystallites still remain bound together due to hydrogen bonding. These individual crystallites must be separated or peeled from the treated fiber or fragment. During the disintegration, newly created surfaces are formed as the microcrystals are separated from the degraded material and unless the individual microcrystals are maintained in a separated condition they will rebond. In order to obtain an efficient shearing, the solids content of the mass being subjected to disintegration should be sufficiently high to provide an efficient transfer of the shear forces. On the other hand, the solids content should not be so high as to allow the separated microcrystals to coalesce and form large aggregates owing to insufficient water present to hydrate with the newly created surfaces of the microcrystals.

In accordance with the preferred procedure, the water-soluble sodium carboxymethyl cellulose is introduced in a dry powder form during this stage of the attrition process. Alternatively, a concentrated solution or a water paste of the water-soluble sodium carboxymethyl cellulose is introduced, the water content of the solution or paste being taken into account to provide the required water content of the mass being attrited. The water content also must be sufficient so as to hydrate the sodium carboxymethyl cellulose during the attrition process. As attrition proceeds, sufficient amounts of the dissolved sodium carboxymethyl cellulose should be present so as to at least partially coat the microcrystals as they are freed from the degraded fibers or particles.

It has been discovered that in order to effect the required attrition to separate the microcrystals and maintain them in individual state and to hydrate the sodium carboxymethyl cellulose, the solids content of the mass when first subjected to attrition should be at least 35% but should not exceed about 60%. When attrition is carried out at above about 50% solids, the solids content must be reduced by adding water slowly while still continuing the attrition in order to hydrate the surface of the microcrystals as the aggregates formed by the attrition at high solids are separated by further attrition at the lower solids content.

Upon completion of the attrition and mixing operations, the mass is then dried. Any desired drying method may be used. A particularly satisfactory drying method is a drum drying method wherein the disintegrated mass is spread as a thin film, for example, about 0.01 inch in thickness, on heated drums. In order to facilitate the spreading of the wet mass as a continuous film on the drying drum, the mass is subjected to additional attrition and mixing as additional water is added so as to reduce the solids content of the mass to a range of from about 25 to 35%. This further attrition continues the freeing of the microcrystals and additional sodium carboxymethyl cellulose is hydrated and dissolved so as to maintain the freed microcrystals as individual, discrete particles and to at least partially coat the microcrystals with sodium carboxymethyl cellulose. Both cellulose and sodium carboxymethyl cellulose will absorb moisture from the atmosphere and, accordingly, the material is dried to a moisture content of about 3 to 10%. The dried film is removed and may be readily ground to a powder and is preferably ground to a size such that all of the material passes through a 60 mesh screen and it is then collected in a suitable storage bin or in desired packages.

Alternatively, upon completion of the attrition and mixing operations, the material may be transferred to a suitable mixing vessel and water added to form a slurry containing from 3 to 10% solids. The slurry is then spray dried to a moisture content of about 3 to 10% and a dry powder collected.

Attrition may also be effected in the absence of sodium carboxymethyl cellulose. Obviously, the solids content should be sufficiently high to provide an efficient transfer of the shear forces but should also be low enough to prevent coalescence of the separated microcrystals and maintain the freed microcrystals as individual, discrete particles. Upon completion of attrition, a solution of sodium carboxymethyl cellulose is added, preferably slowly, and attrition and mixing continued so as to provide a thorough mixing and at least partially coat the individual microcrystals. Alternatively, dry sodium carboxymethyl cellulose may be added making certain that sufficient water is present to hydrate the sodium carboxymethyl cellulose and keep the particles separated. Where the product is to be drum dried, the solution of sodium carboxymethyl cellulose may provide the water necessary to reduce the solids content to a level necessary to facilitate the spreading of a continuous film of the wet mass on the surface of the drying drum. When dry sodium carboxymethyl cellulose is added, water must be added to obtain the desired solids content. If the product is to be spray dried, the mass is transferred to a suitable mixer and water added to form a slurry containing 3 to 10% solids and then spray drying.

For the purposes of the present invention, the sodium carboxymethyl cellulose should have sufficient unsubstituted hydroxyl groups so that the sodium carboxymethyl cellulose can hydrogen bond to the individual cellulose microcrystals upon drying. The substitutent groups should be sufficient to impart water-solubility. The sodium carboxymethyl cellulose necessary for the purposes of this invention has a degree of substitution of $0.75 \pm 0.15$. In the class of so-called low and medium viscosity grades of sodium carboxymethyl cellulose, the viscosity of 2% solutions may vary within a range of about 20 to 800 centipoise. In the class of high viscosity grades of sodium carboxymethyl cellulose, the viscosity of 1% solutions may vary up to about 2200 centipoise. Sodium carboxymethyl cellulose having a degree of substitution outside this range does not prevent hornification or partial hornification of the cellulosic material during drying. This effect on the dried material may be termed a barrier effect and an effective barrier prevents the irreversible bonding or hornification of the microcrystalline cellulose during drying. Subsequently, when the dried material is placed in water and subjected to a mixing or beating step, the dried material readily disperses in the water and forms a firm gel.

It has been found that an edible jelly having improved spreadability and heat-resistance to structural change and therefore particularly useful for bakery fillings and toppings may be provided by incorporating the particular above-described water-insoluble organic particles into the recipe. The use of this material, when introduced into the recipe at the right time, in the right way and within a rather narrow weight range considerably improves the spreadability and heat-resistance of jellies employing either pectin or starch as the jelling agent, these being the most commonly used.

In accordance with this invention, the first step in preparing the edible jelly is to disperse in water a relatively small amount of the above-described finely-divided water-insoluble organic particles consisting of 85 to 95% by weight of beta-1, 4 glucan intimately associated with 5 tp 15% by weight of sodium carboxymethyl cellulose having a degree of substitution of $0.75 \pm 0.15$. This dispersion is stirred vigorously until smooth and viscous, which may take from about five to ten minutes. When making a pectin jelly, pectin or a pectin-sucrose blend is stirred into the organic particle dispersion while heating to solubilize the pectin. The same amount of heat and stirring is actually required as with an ordinary pectin jelly but the organic particle dispersion is cloudy and it cannot be readily ascertained visually when the pectin is in solution. Thus, the best procedure is to heat to boiling since this assures that the pectin will go into solution. It is essential that the pectin not be added until after the water-insoluble organic particles have been dispersed because the pectin being water-insoluble will tie up the water if added first so that the water-insoluble organic particles cannot disperse. Sucrose, an artificial coloring and, if desired, a preservative, are then added and mixed in, after which the desired flavoring, either natural or artificial, is added. Finally, a food acid such as citric, fumaric, adipic, maleic, or the like is added in an amount sufficient to reduce the pH down to the range of about 2.8 to 3.3 whereupon the jelly forms.

The above-described water-insoluble organic particles should constitute between 0.1 and 3.0% of the weight of the jelly, preferably from about 0.5 to 1.5%. If these particles amount to over about 3% of the weight of the jelly, the desired handling and spreading properties will not be brought about. If the amount is less than 0.5% of the weight of the jelly, heat stability is not achieved. If desired, and it will generally be economically advantageous, a relatively small amount of starch or carboxymethyl cellulose may be added to the recipe. It has been found that these materials enhance or supplement the function of the water-insoluble organic particles so that smaller amounts of these particles may be employed. If starch or carboxymethyl cellulose is employed, it is not used in amounts sufficient to be the gelling agent which, in the foregoing procedure, is still the pectin.

Structural continuity of the pectin jelly containing the particular herein referred to water-insoluble organic particles permits these jellies to be mechanically deposited and mechanically spread, thus making for higher speed and more efficient production of such bakery goods as cookies and the like. The high heat resistance affords the option of permitting the jelly to be deposited and/or spread before baking without penalizing the organoleptic properties of the finished product. Prior to this invention, it has been a common practice to deposit a pectin jelly on bakery goods such as cookies prior to baking but unless the jelly is deposited in a depression provided in the cookie dough, the jelly runs off of the product during baking, which not only spoils the appearance of the product but forms sugary deposits in the oven making frequent cleaning necessary. With a jelly containing the particular hereinbefore described finely-divided water-insoluble organic particles, the jelly can be deposited on a flat horizontal surface of the bakery product and it will remain as deposited during baking, thus avoiding fouling the oven. This heat-resistance of the jelly will be especially advantageous for use with bakery products which are now sold at retail in frozen, unbaked form since, when such products are baked in the home, the non-dripping of the jelly into the oven will be especially appreciated.

A pectin gel prepared as set forth above has the appearance of containing fruit puree, although none is present. However, the highest level practice of the invention does call for using real fruit and the fruit is added to the dispersion of the water-insoluble organic (cellulosic) particles and pectin-sucrose blend. It is essential that the fruit be added before the citric acid because the dispersion starts to jell immediately upon the addition of the citric acid. As previously mentioned, with conventional bakery pectin jellies, it is necessary to use a high level of fruit (30 to 50%) to provide heat stability if the jelly is to be deposited on the bakery goods before baking. When the previously decribed particular water-insoluble organic particles are included in the recipe a fruity flavored tasty jelly that will remain structurally stable under baking temperature is achieved with a much lower level of fruit. In fact, the fruit need constitute only about ten percent of the total weight of the jelly to produce a highly desirable taste and appearance.

In addition to improving the spreadability and heat resistance of a pectin jelly, the present invention also improves these qualities of a jelly employing starch as the gelling agent, while permitting the use of lower levels of starch. Here again, the first step in preparing the jelly is to disperse the aforesaid water-insoluble particles in water. To this dispersion is stirred in fruit, sucrose, artificial coloring and if desired, a preservative. A starch slurry is then added to this mixture in a relatively small amount, the starch constituting less than 4% of the entire formula. While with the pectin jelly described above, the pectin is added before the fruit; in the case of the starch jelly the fruit is added before the starch. Once the starch is added, the mixture starts to jell making it impractical if not impossible to add the fruit later. Finally, a food acid is added in an amount to balance or bring out the flavor. In the case of a pectin jelly, the acid is needed to cause the mixture to jell but with the starch jelly, it is not needed for that purpose.

One example of what has been found to be a tasty jelly having excellent spreadability and which does not break down under baking conditions has the following formulation:

| Ingredient | Percent by Weight |
| --- | --- |
| Cellulose stabilizer* | 1.000 |
| Water | 16.725 |
| Pectin, 150 grade | 0.850 |
| Sucrose | 14.800 |
| Raspberries | 10.000 |
| FD&C Red. No. 2 (4%) | 0.150 |
| FD&C Yellow No. 6 (4%) | 0.050 |
| Caramel coloring (20%) | 0.225 |
| Sodium benzoate | 0.060 |
| Modified starch | 2.000 |
| Corn syrup 64DE | 53.400 |
| Imitation Raspberry flavoring | 0.020 |
| Citric acid (50%) | 0.720 |

*Consisting of from 85% to 95% by weight of B-1,4 glucan intimately associated with 5% to 15% by weight of sodium carboxymethyl cellulose having a degree of substitution of 0.75 ± 0.15.

Having thus described the invention, what is claimed is:

1. An edible jelly having improved spreadability and heat-resistance comprising a mixture of a gelling agent, sucrose, flavoring, a food acid, water and finely-divided water-insoluble organic particles consisting of from 85 to 95% by weight of beta-1, 4 glucan intimately associated with 5 to 15% by weight of sodium carboxymethyl cellulose having a degree of substitution of 0.75 ± 0.15, said organic particles constituting at least about 0.5% of the weight of the mixture.

2. The jelly of claim 1 wherein said organic particles constitute between about 0.5 and 1.5% of the weight of the mixture.

3. The jelly of claim 1 including real fruit.

4. The jelly of claim 1 wherein the gelling agent is pectin.

5. The jelly of claim 4 including starch.

6. The jelly of claim 1 wherein the gelling agent is starch.

7. The method of preparing an edible jelly having improved spreadability and heat-resistance comprising dispersing in water finely-divided water-insoluble organic particles consisting of from 85 to 95% by weight of beta-1, 4 glucan intimately associated with 5 to 15% by weight of sodium carboxymethyl celluose having a degree of substitution of 0.75 ± 0.15, adding pectin to the dispersion, heating sufficiently to solubilize the pectin, adding sucrose and artificial coloring, mixing the foregoing, adding flavoring and adding sufficient food acid to form a jelly, said water-insoluble organic particles constituting between about 0.5 to 1.5% of the weight of the jelly.

8. The method of claim 7 comprising adding a starch slurry, heating to gelatinize and stirring immediately prior to adding the food acid.

9. The method of preparing an edible jelly having improved spreadability and heat-resistance comprising dispersing in water finely-divided water-insoluble organic particles consisting of from 85 to 95% by weight of beta-1, 4 glucan intimately associated with 5 to 15% by weight of sodium carboxymethyl cellulose having a degree of substitution of 0.75 ± 0.15, adding to the dispersion sucrose and artificial coloring, mixing the foregoing, adding flavoring, adding a starch slurry, heating to gelatinize, then adding sufficient food acid to balance the flavor, said water-insoluble organic particles constituting between about 0.5 to 1.5% of the weight of the jelly.

* * * * *